United States Patent
Klein et al.

(10) Patent No.: US 12,396,381 B2
(45) Date of Patent: Aug. 26, 2025

(54) SELF-PROPELLED AGRICULTURAL WORK MACHINE HAVING A TOWING MODE

(71) Applicant: DEERE & COMPANY, Moline, IL (US)

(72) Inventors: Andre Klein, Kaiserslautern (DE); Felipe De Moraes Boos, Kaiserslautern (DE); Dennis Kremer, Frankenstein (DE); Max Kissel, Kaiserslautern (DE)

(73) Assignee: Deere & Company, Moline, IL (US)

( * ) Notice: Subject to any disclaimer, the term of this patent is extended or adjusted under 35 U.S.C. 154(b) by 206 days.

(21) Appl. No.: 17/811,348

(22) Filed: Jul. 8, 2022

(65) Prior Publication Data

US 2023/0010916 A1    Jan. 12, 2023

(30) Foreign Application Priority Data

Jul. 8, 2021  (DE) .......................... 102021117704.9

(51) Int. Cl.
*A01B 51/02* (2006.01)
*A01B 59/042* (2006.01)
*A01B 69/00* (2006.01)

(52) U.S. Cl.
CPC .................................. *A01B 69/004* (2013.01)

(58) Field of Classification Search
CPC .................................................. A01B 69/004
See application file for complete search history.

(56) References Cited

U.S. PATENT DOCUMENTS

| 9,840,277 B1 | 12/2017 | Beech | |
| 2010/0044998 A1* | 2/2010 | Franchineau | B60D 1/36 280/491.1 |

(Continued)

FOREIGN PATENT DOCUMENTS

| DE | 1085432 B | 7/1960 |
| DE | 4142604 A1 | 8/1993 |

(Continued)

OTHER PUBLICATIONS

German Search Report issued in application No. DE102021117704.9 dated Mar. 18, 2022 (06 pages).

(Continued)

*Primary Examiner* — Scott A Browne
*Assistant Examiner* — Rami Nabih Bedewi
(74) *Attorney, Agent, or Firm* — Hanley, Flight & Zimmerman, LLC

(57) ABSTRACT

A self-propelled agricultural work machine comprising: an energy source; a ground engaging element configured with a drive train, the ground engaging element further configured to be driven in a normal operating mode by at least one of the energy source and drive train; a carrying frame supported on the ground engaging element; and a control unit in communication with an actuator configured to steer the ground engaging element, the control unit configured to transmit signals so as to specify a steering angle of the ground engaging element and, in the event of a failure of at least one of the energy source or the drive train, the control unit configured to operate in a towing mode in which the control unit controls the actuator based on the signals from a sensor so as to detect the angle between a tow bar of a towing vehicle and the agricultural work machine.

18 Claims, 1 Drawing Sheet

(56) References Cited

U.S. PATENT DOCUMENTS

| | | | |
|---|---|---|---|
| 2015/0105965 A1* | 4/2015 | Blackwell | A01B 69/004 701/28 |
| 2017/0106899 A1* | 4/2017 | Xu | B60L 1/003 |
| 2019/0064795 A1* | 2/2019 | Berggren | B60D 1/44 |
| 2019/0385461 A1* | 12/2019 | Blomstrand | B60D 1/44 |
| 2019/0391577 A1* | 12/2019 | Uppalapati | H02J 7/0048 |
| 2020/0254892 A1* | 8/2020 | Hadi | B60L 53/68 |
| 2021/0307249 A1* | 10/2021 | Jongmans | A01D 75/002 |

FOREIGN PATENT DOCUMENTS

| | | |
|---|---|---|
| DE | 19746927 A1 | 5/1999 |
| DE | 102011090034 A1 | 7/2013 |
| EP | 2022306 B1 | 12/2010 |
| EP | 3553486 A2 | 10/2019 |

OTHER PUBLICATIONS

Electronic-hydraulic forced steering from Krampe, Jun. 29, 2012, pp. 1-6 [online]. Retrieved from the Internet <URL: https://www.topagrar.com/technik/news/technik-news-elektronisch-hydraulische-zwangslenkung-von-krampe-9365489.html>.

Zunhammer: Electronic forced steering, pp. 1-2 [online]. Retrieved from the Internet <URL: https://www.profi.de/aktuell/neuheiten/zunhammer-elektronische-zwangslenkung-11749978.html>.

Zunhammer: Forced steering, pp. 1 [online]. Retrieved from the Internet <URL: https://www.zunhammer.de/de/produkte/elektronik/zwangslenkung>.

Goldhofer semi-trailer, pp. 1-18 [online]. Retrieved from the Internet <URL: https://docplayer.org/3045578-Goldhofer-sattelanhaenger.html>.

International Standard ISO 11783-10, Task controller and management information system data interchange, Sep. 15, 2015, pp. 1-214.

* cited by examiner

SELF-PROPELLED AGRICULTURAL WORK MACHINE HAVING A TOWING MODE

RELATED APPLICATIONS

This document claims priority based on German Patent Application No. 102021117704.9, filed on Jul. 8, 2021, which is hereby incorporated by reference into this application.

DESCRIPTION

This disclosure relates to a self-propelled agricultural work machine, specifically an agricultural work machine operable in a towing mode.

BACKGROUND

Self-propelled work machines are used in different embodiments within the scope of agriculture. They can be designed as self-propelled harvesting machines (e.g. combine harvesters, forage harvesters, cotton pickers or sugar cane harvesters), as agricultural tractors or as self-propelled spraying machines or sowing machines. They are usually equipped with a cabin or an open driver's platform in order for an operator to be able to control the self-propelled work machine. Automated self-propelled work machines have also been described that are not equipped with an operator's workplace since the work machine operates autonomously, i.e. not under manual control of an operator, or is remote-controlled.

In order for said work machines to be self-propelled, they are equipped with an energy source and a drive train that can move them across a field. The energy source can be a combustion engine that by way of an arbitrary (e.g. mechanical, electrical and/or hydraulic) drive train influences driven ground engaging element in the form of wheels and/or crawler tracks and where appropriate said energy source influences a power take-off shaft so as to drive a work tool. In the case of other, in particular autonomous, self-propelled work machines, a rechargeable battery or a cable, which produces a connection to a stationary or movable current source, is used as an energy source.

As is the case with any machine, there is the risk that a self-propelled work machine can become damaged. Consequently, the combustion engine could fail owing to technical problems or lack of fuel or the drive train leading to the ground engaging element not to operate correctly. It is expedient in such cases to tow the self-propelled work machine by an arbitrary towing vehicle using a towing cable or a tow bar, insofar as it is not possible to easily remove the fault on site, e.g. at the field. However, in so doing, it is to be noted that, when the work machine is being towed, it is necessary to steer the ground engaging element of the work machine that is being towed and—in contrast to conventional passenger vehicles—it is generally no longer possible on account of the work machine being damaged for its operator to steer said work machine even if a workplace is provided for this operator.

In specific cases, the steerable wheels of a self-propelled work machine that is to be towed could be raised and placed on roller carriers with freely trailing steering wheels, in a similar manner to passenger cars that are to be towed. However, this possibility is not possible on fields since the ground generally prevents this approach. Another possibility is to hydraulically uncouple the steering cylinder of the work machine that is to be towed from its steering control valve and to connect it to a control valve (SCV, selective control valve) of the towing vehicle, which has an output that is usually located on an interface on the rear side of an agricultural tractor. In so doing, it is possible when uncoupling the cables on the one hand for hydraulic fluid to leak into the ground and on the other hand the operator of the towing vehicle must not only steer the towing vehicle but they must also use a separate control input to control the work machine that is being towed. This procedure is consequently cumbersome and hazardous.

SUMMARY

A self-propelled agricultural work machine comprising: an energy source; a ground engaging element configured with a drive train, the ground engaging element further configured to be driven in a normal operating mode by at least one of the energy source and drive train; a carrying frame supported on the ground engaging element; and a control unit in communication with an actuator associated with the agricultural work machine and the ground engaging element, the control unit configured to transmit signals so as to specify a steering angle of the ground engaging element and, in the event of a failure of at least one of the energy source or the drive train, the control unit configured to operate in a towing mode in which the control unit controls the actuator based on the signals from a sensor so as to detect the angle between a tow bar, a towing vehicle and the agricultural work machine that is being towed by the towing vehicle.

A method for operating an agricultural work machine in a towed mode comprising: providing an energy source and an associated ground engaging element configured with a drive train; determining, with the control unit, when a failure of at least one of the energy source or the drive train has occurred; initiating, with the control unit, a towed steering mode comprising: receiving, with the control unit, a towed steering signal from a sensor which detects the angle between a tow bar, a towing vehicle and the agricultural work machine being towed by the towing vehicle; generating, with a control unit, a towed steering angle from the towed steering signal of the ground engaging element; and controlling an actuator associated with the agricultural work machine based on the towed steering angle.

DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
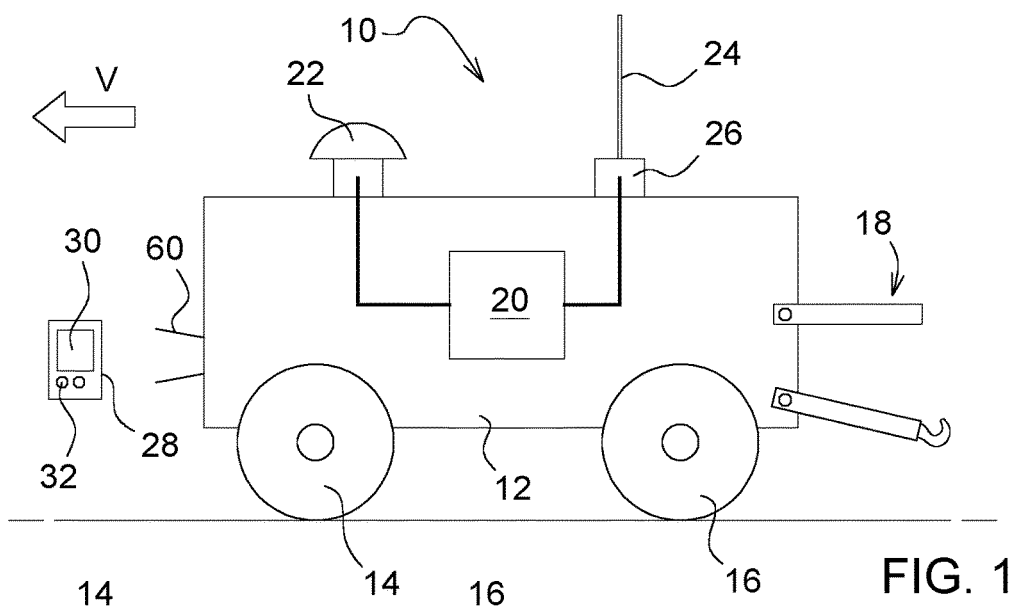
FIG. 1 illustrates a lateral view of a self-propelled work machine.

The present disclosures relates to a self-propelled agricultural work machine comprising a carrying frame that is supported on steerable and drivable ground engaging element, wherein the drivable ground engaging element can be driven by an energy source and a drive train, and an electronic control unit that is connected to an actuator in such a manner as to be able to transmit signals so as to specify the steering angle of the steerable ground engaging element and is capable of being operated independently from the energy source. In the event of a failure of the energy source and/or of the drive train of the drivable ground engaging element, the electronic control unit can be operated in a towing mode in which said electronic control unit controls the actuator based on the signals from a sensor so as to detect the angle between a tow bar, which connects a towing vehicle and the work machine that is being towed, and the work vehicle.

In other words, the work machine is towed by a separate vehicle using a tow bar in the event of a failure of the energy source and/or of the drive train of the drivable ground engaging element. The control unit remains active in the towing mode and controls the actuator so as to specify the steering angle of the steerable ground engaging element with the aid of the signals from a sensor which detects the angle between the tow bar and the work machine. In this manner, as it is being towed the work machine is steered in such a manner that it follows the towing vehicle without said work machine having to be manually steered by an operator of the work machine or of the towing vehicle.

The control unit and the actuator can be supplied with energy via a low voltage network of the work machine. The steerable ground engaging element are in particular wheels. If the work machine is designed with center-pivot steering, the steerable ground engaging element would be the wheels or crawler tracks of the work machine and the actuator would control the angle between the two parts of the work machine. The drivable ground engaging element could likewise be wheels or crawler tracks. The energy source can be a combustion engine or a rechargeable battery that can be drive connected to the drivable ground engaging element by way of a mechanical, electrical or hydraulic drive train. The control unit can be operated in a normal operating mode to control the actuator automatically or in response to an operator input.

In some cases, attempts have been made to separate the steering gear of the agricultural work machine that is to be towed from the wheels that are to be steered and in lieu thereof to connect the wheels that are to be steered to a tow coupling that is movable about the vertical axis (German Patent Appl. No. DE 1 085 432 B). The movement of the tow bar, which is connected to the towing vehicle, about the vertical axis is then transmitted mechanically to the steerable wheels of the self-propelled work machine that is to be towed and said steerable wheels are steered with the tow bar. This is a purely mechanical solution that requires a suitably adapted steering gear.

In other cases, attempts have been made to use an electrical connecting cable to provide electrical energy and steering data from the towing vehicle to the vehicle that is to be towed and is designed as an electric vehicle so that said vehicle that is to be towed can be steered with the aid of the steering data (German Patent Appl. No. DE 10 2011 090 034 A1). However, this approach requires sufficient software compatibility of the two vehicles and cannot be used if the drive system of the vehicle that is to be towed is defective, since the connecting cable cannot be used to pull the vehicle that is to be towed.

Finally, mechanical, electrical or hydraulic automatic steering arrangements of towed work tools are described which—in a similar manner to the arrangement according to German Patent Appl. No. DE 1 085 432 B—control the wheels of the work tool with the aid of the angle between the work tool and the tow bar with which they are pulled with an agricultural tractor (German Patent Appl. No. DE 197 46 927 A1, U.S. Pat. No. 9,840,277 B1).

Figure 2:
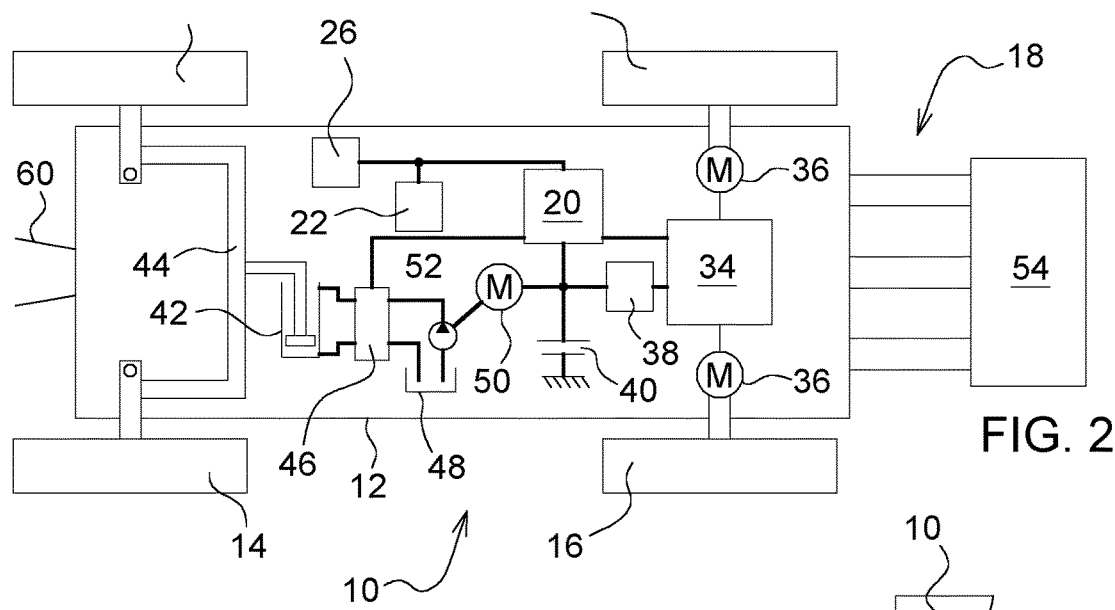
FIG. 2 illustrates a schematic plan view of the self-propelled work machine shown in FIG. 1.

FIGS. 1 and 2 illustrate a lateral view and a plan view of an arbitrary self-propelled work machine 10. This is built on a carrying frame 12 which is supported on the ground by a front steerable ground engaging element in the form of wheels 14 and rearward driven ground engaging element in the form of wheels 16 and can be moved in a forwards direction V across a field. An interface 18 for a work tool 54 (illustrated schematically in FIG. 2) is arranged on the rear side of the work machine 12 and is in the form of a three-point coupling that could also be designed in any other form.

The self-propelled work machine 10 that is illustrated here is designed as an autonomous vehicle, i.e. it does not have a work place for an operator. On the contrary, the operation of the work machine 10 is controlled by an electronic control unit 20, in particular based on signals from a receiver 22 of signals from a satellite based position determining system, such as GPS, Glonass, Galileo etc. With the aid of a card that is stored in the control unit 20, the work machine 10 moves in a known manner across a field in order to perform any arbitrary work there using the work tool that is fastened to the interface 18.

A communication interface 26 that is connected to an antenna 24 renders communication possible between the control unit 20 and a spaced operator interface 28 that is equipped with display 30 and input interface 32 for an operator. The operator interface 28 communicates accordingly by way of an arbitrary protocol with the control unit 20 in order on the one hand to transmit orders and work parameters to the control unit 20 and on the other hand to obtain status reports. Reference is made in this regard to the standard ISO 11783-10.

The main power supply for the self-propelled work machine 10 is provided by an energy source 34 which can be for example a combustion engine having a generator or it can be a relatively large rechargeable battery that has for example a voltage of some 100 volts and a capacity of some 100 Ah. The energy source 34 supplies current to electric motors 36, (which are controlled by the control unit 20) so as to drive the wheels 16 and where appropriate the wheels 14 and said energy source can also supply mechanical or electrical or hydraulic energy to a mechanical power take-off shaft or an electrical interface so as to drive movable elements of the work tool 54. If the energy source 34 is a combustion engine, the wheels 16 and where appropriate 14 can be driven alternatively mechanically or hydraulically so as to provide the illustrated drive.

In addition, a charging unit 38 that is charged with electrical energy from the energy source 34 supplies electrical power to a low voltage network of the work machine 10 that comprises an electrical storage device 40. The low voltage network can be operated as usual for example with 12 or 24 V.

The steering of the front wheels 14, i.e. the adjustment of the angle of the wheels 14 about the vertical axis, is performed by an actuator 42 that is designed in this case as a hydraulic cylinder and adjusts the steering angle of the wheels 14 by way of a bar 44. In contrast to what is illustrated, the actuator 42 could also be designed as a synchronized cylinder. A valve unit 46 optionally connects the chambers of the actuator 42 to a reservoir 48 for hydraulic fluid and the high-pressure connection of a hydraulic pump 50. The valve unit 46 is controlled by the control unit 20 in order to guide the work vehicle 10 on a desired path across the field. The pump 50 is driven mechanically by an electric motor 52 that is connected to the low voltage network of the work vehicle 10. In the case of a different embodiment, the actuator 42 could be designed as an electric motor and supplied from the electrical storage device 40, controlled by the control unit 20.

After all this, in the normal operating mode of the self-propelled work machine 10, the energy source 34 provides the power for the propulsion of the work vehicle 10 and a work tool 54 that is attached to the interface 18, as well as, where appropriate, the drive power for drivable elements of the work tool 54. The low voltage network that is supplied by the power source 40 is used to supply the control unit 20 and the motor 52 as well as the communication interface 26 and the receiver 22 and, even if the energy source 34 should fail, said low voltage network can still be operated for a sufficiently long time, in the order of one hour, for example, so that the work vehicle 10 can still be steered even if the energy source 34 or an element of the drive train of the driven wheels 16 fails.

Figure 3:
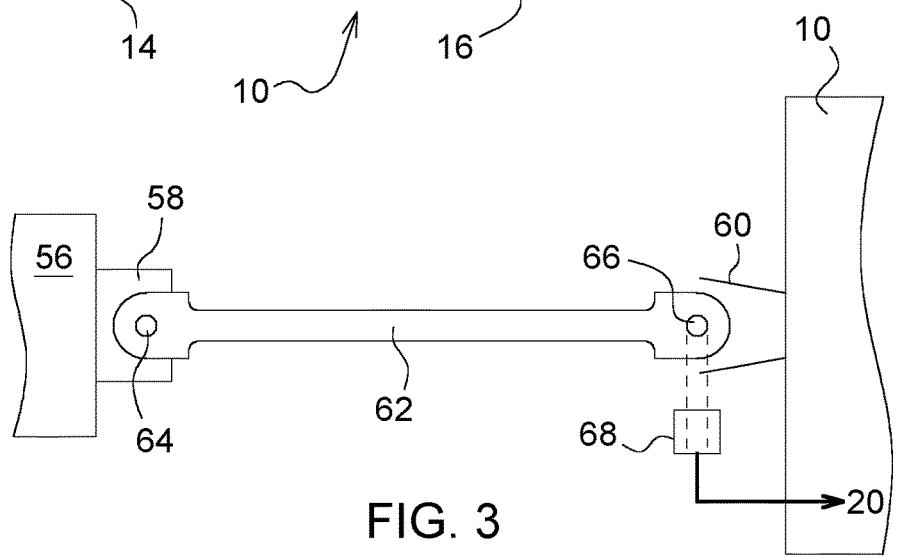
FIG. 3 illustrates a plan view of a towing connection between a towing vehicle and the self-propelled work machine.

FIG. 3 shows a connection between the self-propelled work machine 10 and another vehicle 56 of any type which, in the event of a failure of the energy source 34 or an element of the drive train of the driven wheels 16 of the self-propelled work machine 10, serves to tow the latter. For this purpose, a coupling 60 is provided on the front side of the work machine 10 that is to be towed and a coupling 58 is provided on the rear side of the towing vehicle 56. One end of a tow bar 62 is releasably connected by a pin 64 to the coupling 58 and another end is releasably connected by a pin 66 to the coupling 60. A sensor 68 detects the angle of the tow bar 62 with respect to the coupling 60 about the vertical axis and transmits corresponding towed steering signals to the control unit 20.

In the case of said failure (of the energy source 34 or of an element of the drive train of the driven wheels 16), the control unit 20 can be operated in a towing mode in which, operated by the low voltage network having the electrical storage device 40, it steers the front wheels 14 of the work machine 10 based on a towed steering angle corresponding to the towed steering signals from the sensor 68. Consequently, a type of automatic steering is realized for towing the work machine 10 and said automatic steering steers the wheels 14 in such a manner that the work machine 10 is automatically steered and follows the towing vehicle 56 in a known manner, similar to known automatic steering of work tools. It is possible in the towing mode for the drivable wheels 16 to freely rotate and for this purpose a mechanical drive train is opened by a corresponding control of a coupling (not illustrated) by way of the control unit 20 or the motors 36 can be controlled accordingly by the control unit 20. In a similar manner, where appropriate, the braking of the wheels 14, 16 can be released by the control unit 20 in the towing mode.

In the event that the energy of the current source 40 should not be sufficient for the low voltage network of the work machine 10 to supply the control unit 20 and the motor 52 as well as to supply the communication interface 26 and the receiver 22 over a sufficient time span with sufficient voltage, it is also possible by way of a suitable cable to provide an electrical connection between the low voltage network of the work machine 10 to a low voltage network of the towing vehicle 56.

It is to be noted that the self-propelled work vehicle 10 does not necessarily have to operate in a purely autonomous manner but rather can be equipped with an operator work place with which the work vehicle 10 can be exclusively or optionally manually controlled. Thus, the work vehicle 10 can be a conventional agricultural tractor which has a combustion engine and mechanical drive of the wheels 16 that are steered only by hand or optionally also in an automatically controlled manner, and which is equipped however with electronic steerable front wheels 14, whose actuator 42 is supplied by a pump 50 that is mechanically driven by the combustion engine. However, for the towing mode, an electric motor 52 may then provided with which the pump 50 is supplied in an electric manner by the low voltage network, where appropriate after manually separating the pump 50 from the mechanical drive train and manually coupling the electric motor 52 to the pump 50. Alternatively, free-wheels can also be provided for this purpose or an electrically driven so-called backup pump can be used, as generally known, in order in the event of a pressure drop in the hydraulic steering and braking system to maintain the pressure in the hydraulic system.

Finally, the self-propelled work vehicle 10 can also be designed as a harvesting machine (e.g. forage harvester, combine harvester, cotton picker, mowing machine, baling press), or a sowing machine or field sprayer.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

What is claimed is:

1. A self-propelled agricultural work machine comprising:
an energy source;
a ground engaging traction surface configured with a drive train, the ground engaging traction surface further configured to be driven in a normal operating mode by at least one of the energy source and the drive train;

a carrying frame supported on the ground engaging traction surface;

an actuator to steer the ground engaging traction surface; and a control unit configured to, in the event of a failure of at least one of the energy source or the drive train, operate in a towing mode and transmit control signals to the actuator, wherein the control signals are based on measurement signals from a sensor indicative of an angle, relative to a vertical axis, between a tow bar of a towing vehicle and the agricultural work machine, the control signals to specify a steering angle of the ground engaging traction surface.

2. The agricultural work machine of claim 1 wherein the energy source of the control unit and of the actuator is provided by a low voltage network of the work machine.

3. The agricultural work machine of claim 1 wherein the ground engaging traction surface is a front steerable ground engaging traction surface, the agricultural machine further comprising a rear driven ground engaging traction surface.

4. The agricultural work machine of claim 1 wherein the ground engaging traction surface is defined by at least one of a wheel assembly or a track assembly.

5. The agricultural work machine of claim 1 wherein the energy source is at least one of a combustion engine or a rechargeable battery associated with the ground engaging traction surface.

6. The agricultural work machine of claim 1 wherein the drive train is at least one of a mechanical, electrical, or hydraulic drive train.

7. The agricultural work machine of claim 1 wherein the control unit can be operated in the normal operating mode to control the actuator automatically or in response to an operator input.

8. The agricultural work machine of claim 1 wherein the ground engaging traction surface is a wheel, and the control unit is configured to initiate the towing mode in response to detection of a failure of the wheel.

9. The agricultural work machine of claim 1 wherein the control unit is configured to determine occurrence of the failure of the at least one of the energy source or the drive train, and wherein the control unit is configured to operate in the towing mode in response to the determination of failure.

10. The agricultural work machine of claim 1 wherein, in the towing mode, the control unit controls the actuator while the agricultural work machine is being towed based on the signals from the sensor received while the agricultural work machine is being towed.

11. The agricultural work machine of claim 1 wherein, in the towing mode, the control unit controls the actuator while the tow bar is coupled to the agricultural work machine based on the signals from the sensor received while the tow bar is coupled to the agricultural work machine.

12. A method for operating an agricultural work machine comprising:

providing an energy source and an associated ground engaging traction surface configured with a drive train;

determining, with a control unit, when a failure of at least one of the energy source or the drive train has occurred; and initiating, with the control unit, a towed steering mode in response to the determined failure, the towed steering mode comprising:

receiving, with the control unit, a towed steering signal from a sensor which detects an angle, relative to a vertical axis, between a tow bar of a towing vehicle and the agricultural work machine being towed by the towing vehicle;

generating, with the control unit, the towed steering angle of the ground engaging traction surface from the towed steering signal; and controlling an actuator configured to steer the ground engaging traction surface based on the towed steering angle.

13. The method of claim 12 further comprising providing the energy source of the control unit and of the actuator by a low voltage network of the work machine.

14. The method of claim 12 wherein the ground engaging traction surface is a front steerable ground engaging traction surface.

15. The method of claim 12 wherein the ground engaging traction surface is defined by at least one of a wheel assembly or track assembly.

16. The method of claim 12 wherein the energy source is at least one of a combustion engine or a rechargeable battery associated with the ground engaging traction surface.

17. The method of claim 12 wherein the drive train is at least one of a mechanical, electrical, or hydraulic drive train.

18. The method of claim 12 further comprising operating the control unit in a normal operation mode to control the actuator automatically or in response to an operator input.

* * * * *